Aug. 18, 1964                D. BUCCICONE                3,144,927
                         FLEXIBLE MAGNETIC CONVEYOR
Filed Sept. 25, 1961                                2 Sheets-Sheet 1
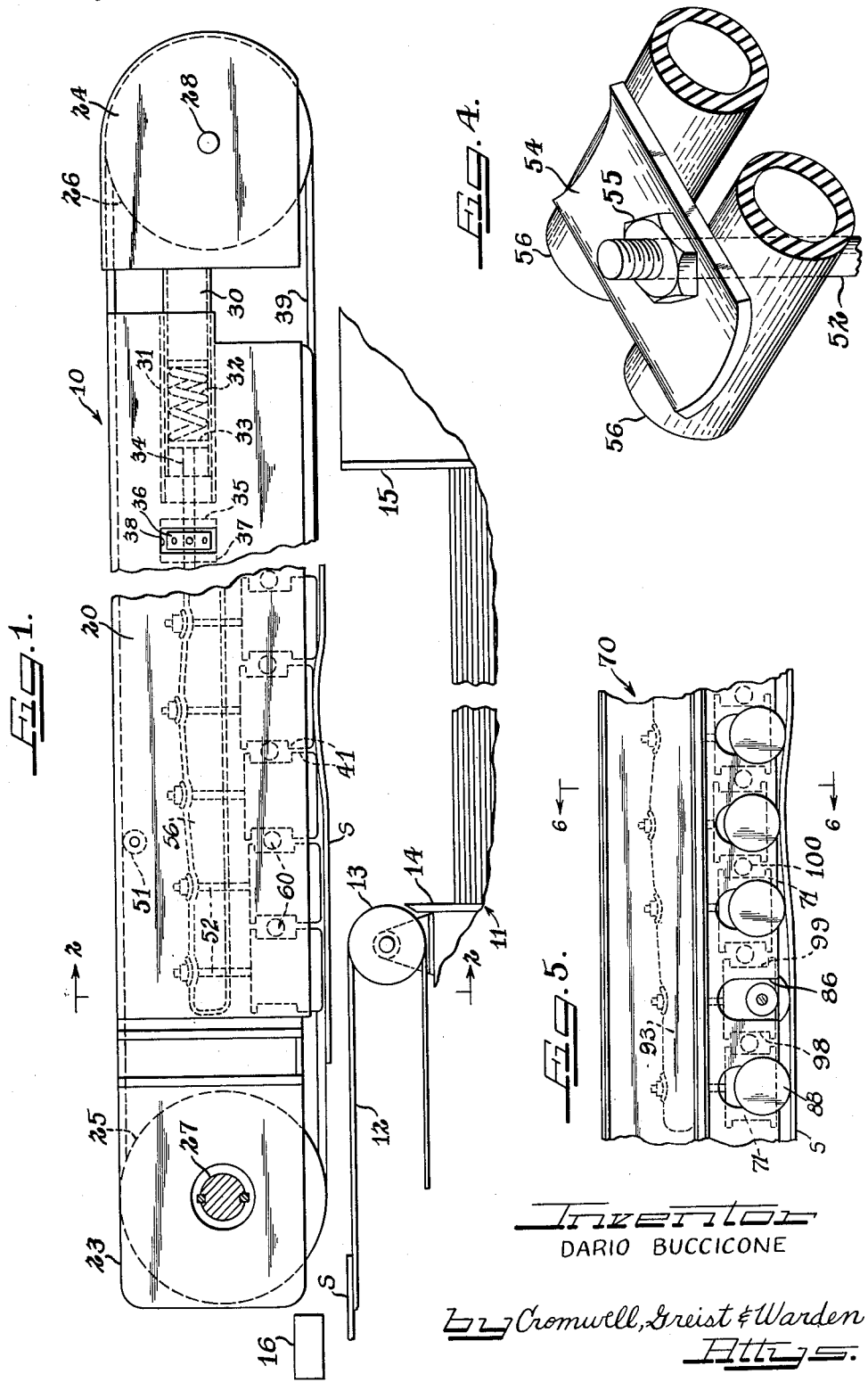
Inventor
DARIO BUCCICONE
by Cromwell, Greist & Warden
Attys.

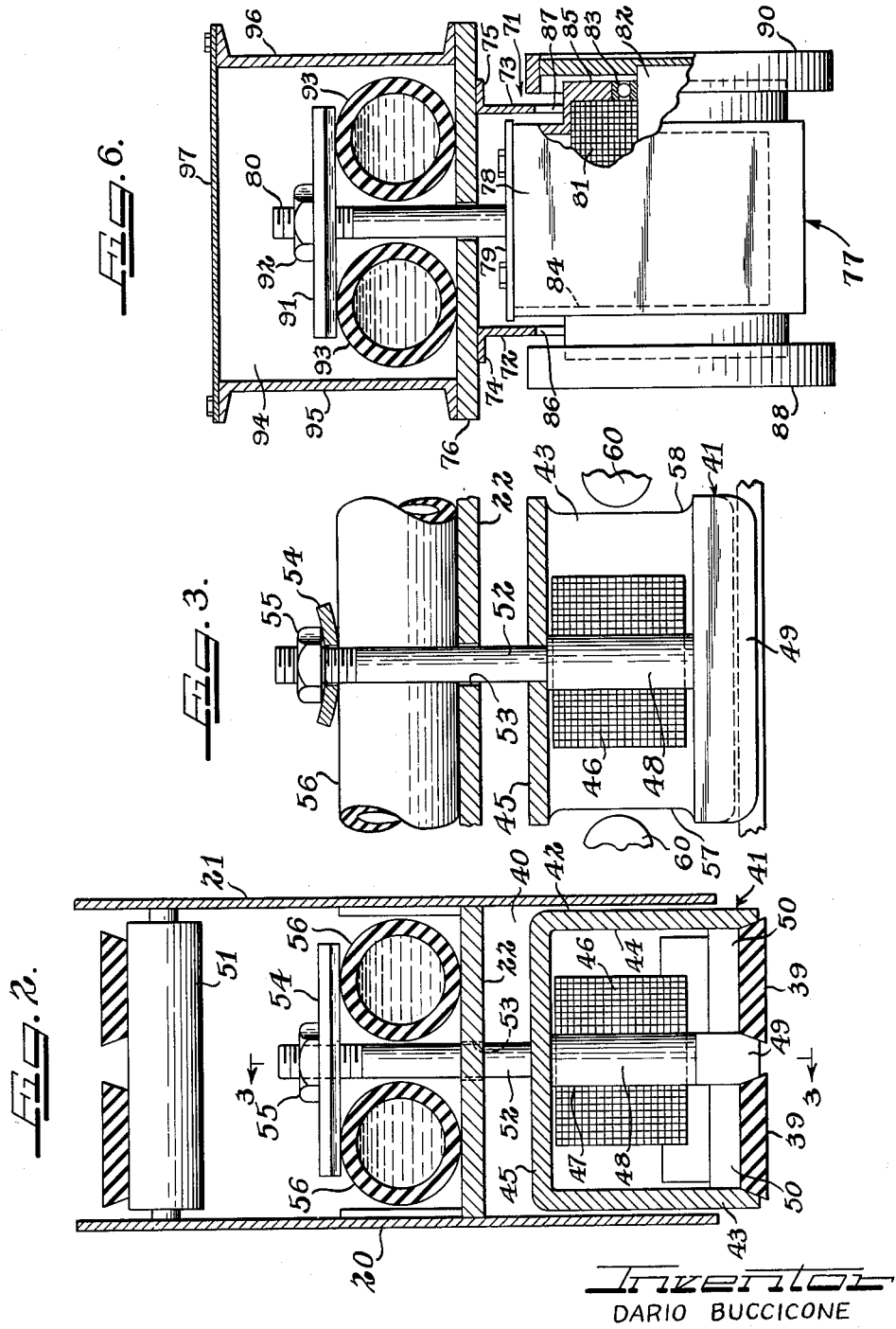

United States Patent Office 3,144,927
Patented Aug. 18, 1964

3,144,927
FLEXIBLE MAGNETIC CONVEYOR
Dario Buccicone, Gary, Ind., assignor to Buccicone Engineering Co., Inc., Gary, Ind., a corporation of Indiana
Filed Sept. 25, 1961, Ser. No. 140,430
13 Claims. (Cl. 198—41)

This invention relates to article conveyors and is more particularly concerned with improvements in an overhead conveyor which employs electromagnetic force for holding sheet material or the like against the bottom surface of the conveyor along which the sheets travel.

Conveying apparatus has heretofore been provided for handling metal sheets of varying width and length in which the sheets are held by electromagnetic force against the bottom run of traveling belts supported on pulleys at opposite ends of the conveyor. Such a conveying apparatus is shown, for example, in my Patent No. 2,642,174, dated June 16, 1953. The prior apparatus, when designed to handle sheets of substantial length, is made with a slight bow on the bottom to accommodate the sag in the belts so that the sheets are bowed slightly as they are advanced by the belts. Consequently, it is difficult to handle certain types of sheets, such as corrugated sheets, which do not readily bend transversely when corrugated lengthwise and thus will not conform to the curvature of the conveyor. A type of conveyor employing electromagnetic force and without the bow in the bottom has been previously designed especially for handling corrugated metal sheeting or like materials. An example of this apparatus is shown in my Patent No. 2,953,238, dated September 20, 1960. With these two types of conveyors metal sheets which are normal and which have been properly finished can be successfully handled. However, due to misadjustments of rolling equipment or because the sheets cannot be properly flattened due to the nature of the material or for other reasons, wavy sheets are sometimes encountered and these are difficult to handle. In cases of heavy materials the irregularities may cause the sheets to drop off the bottom of the conveyor. If the sheets have a long natural bow and are heavy, the material will eventually work away from the influence of the magnets as it advances beneath the conveyor. Magnets cannot bend the material if the thickness is too great for the sheet to flex or if the nature of the material is such that flexing is impossible. It is an object of the present invention, therefore, to overcome these difficulties and this is accomplished by providing a conveyor which will flex and conform to some extent to the shape of the sheet as it is conveyed.

It is a more specific object of the invention to provide improvements in an overhead rail-type magnetic conveyor for handling sheet materials wherein the conveyor is divided throughout its length into a series of independently mounted sections or units which are adapted to have a limited vertical movement so that the bottom sheet carrying surface of the conveyor will adjust itself to the contour of the sheet within predetermined limits so as to adapt the conveyor to the handling of sheets having a wave or similar defect.

It is a still more specific object of the invention to provide an electromagnetic conveyor of the type wherein metal sheets are carried on the lower run of one or more traveling belts with the sheet held against the surface of the belts by a series of electromagnetic units spaced lengthwise of the conveyor and mounted so as to have a limited vertical movement to permit the belts to conform to irregularities on the surfaces of the sheets as the sheets are carried along beneath the conveyor.

It is a further object of the invention to provide a conveying apparatus of the type described which comprises an elongate frame having a series of electromagnetic units mounted in spaced relation throughout the length of the frame with each of the units supported for vertical movement on a cross bar which is carried on the top surface of a pair of flexible tubes, which tubes are filled with a fluid material so that they cushion the raising and lowering of each of the individual magnetic units, and the units being free to follow the contour of the surface of the sheet as it advances beneath the conveyor.

It is another object of the invention to provide an electromagnetic sheet conveyor wherein a series of electromagnetic assemblies are supported for vertical movement on an elongate frame with each of the electromagnetic assemblies comprising a horizontally disposed coil and a horizontal core member rotatably mounted in the coil with wheel-like extensions on opposite ends thereof which core extensions are adapted to engage the surface of the sheet to be conveyed and with each electromagnetic assembly depending from a cross bar which rests on a pair of fluid filled flexible tube supports mounted in longitudinally extending relation on the conveyor frame.

These and other objects and advantages of the invention will be apparent from a consideration of the several forms of the apparatus which are shown by way of illustration in the accompanying drawings wherein:

FIGURE 1 is a side elevation, partially schematic, and with parts broken away, illustrating a sheet piler which incorporates therein one or more conveyor units embodying the principal features of the invention;

FIGURE 2 is a cross section taken on the line 2—2 of FIGURE 1 to an enlarged scale;

FIGURE 3 is a fragmentary, longitudinal, vertical section taken on the line 3—3 of FIGURE 2;

FIGURE 4 is a fragmentary perspective view showing one of the cross bars employed for supporting the electromagnetic assemblies;

FIGURE 5 is a side elevation of a portion of a conveyor unit illustrating a modified form of the invention; and FIGURE 6 is a cross section taken on the line 6—6 of FIGURE 5 to an enlarged scale.

Referring first to FIGURES 1 to 4, there is illustrated a conveying and piling apparatus which employs a conveyor constructed in accordance with the principles of the invention. In the apparatus illustrated in FIGURE 1, the conveyor 10 is arranged above a piler box 11 and the discharge end of a sheet delivery conveyor 12. The sheet delivery conveyor 12 terminates at the end support roller 13 which is mounted adjacent the upper edge of a vertically disposed back stop plate 14 forming one end of the piler box 11. The other end of the piler box is indicated by the vertically disposed end stop plate 15. The conveyor 10 is equipped with a suitable end stop mechanism (not shown). An automatically operated switch assembly 16 may be employed with the apparatus to control the operation of the conveyor 10.

The conveyor 10 is in the form of a rail unit which comprises an elongate frame formed by a pair of side plates 20 and 21 (FIGURES 1 and 2) which are connected intermediate their top and bottom edges by a web forming cross plate 22 and have at their opposite ends pulley housings or supports 23 and 24 with the unit thus formed being supported at its opposite ends on suitable stands or end frames (not shown). The pulley housings or frames 23 and 24 support pairs of end pulleys 25 and 26 which are mounted on suitable cross shafts 27 and 28 with the cross shaft 27 at the entry end of the unit being connected to a suitable power drive mechanism (not shown). The pulley housing 24 at the other end of the conveyor receives the idler pulleys 26 which are each mounted on the end of a hollow tube member 30 of rectangular cross section which is received in telescoping and sliding relation in a longitudinal guideway 31 formed at the ends of the conveyor side plates 20 and 21, the guideway having a width sufficient to accommodate the mounting tube members 30 for each of the two belt pulleys 26. A compression spring 32 is seated in the tube member 30 with the inner end thereof engaging a shoulder forming plate 33 adjacent the end of an adjusting bolt 34. The bolt 34 projects at one end in sliding relation into the open inner end of the tube member 30. The other end of the bolt 34 is threaded and extends through an upwardly opening slot in a cross plate 35 which is fixed between the conveyor plates 20 and 21. An adjusting nut 36 is mounted on each bolt 34 between the slotted cross plate 35 and an adjoining slotted cross plate 37 which is longitudinally spaced from the cross plate 35. One of these plates has the slots therein capped to prevent upward movement of the adjusting bolts 34. The adjusting nuts 36 are accessible through openings 38 provided in the side plates 20 and 21 so as to facilitate adjustment of the tension in the belts 39 carried on the pulleys 25 and 26.

The magnet housing 40 which is formed between the lower margins of the side plates 20, 21 and the intermediate cross plate 22 opens downwardly and receives a series of electromagnet assemblies 41 which are arranged in longitudinal alignment and secured within the housing so as to have a limited vertical movement.

The electromagnet assemblies 41 each comprise a housing 42 of inverted U-shaped cross section. The downwardly opening channel-shaped housing member is constructed of nonmagnetic material with side forming plates 43 and 44 and a connecting top web plate 45. An electromagnetic coil 46 is secured in each of the housings 42 together with a core piece 47 of inverted T shape having its stem portion 48 extending through the coil 46 and secured to the top plate 45 of the housing. The bottom or head end of the core member 47 is in the form of an elongate bar 49 with converging tapered sides forming center guides for the two belt members 39. The assemblies 41 also comprise a pair of belt riding strips or wear plates 50 which are secured in horizontally disposed relation between the side plates 43 and 44 of the yoke-like housing 42 adjacent the bottom edges thereof. The side plates 43 and 44 have their bottom inner edges cut away to form tapered surfaces for receiving the belts 39 which are of wedge-shaped cross section. The belts 39 are supported along their upper run by a series of rollers 51 (FIGURE 1) which are journaled on suitable shafts extending between the side plates 20 and 21. Each of the yoke or housing members 42 for the magnetic assemblies 41 has an upstanding stem or stud 52 which extends through an aperture 53 in the cross plate 22 and has a cross bar or plate 54 secured on the threaded upper end thereof by a nut 55. The cross bar or plate 54 is generally rectangular in shape and is bent or curved as shown in FIGURE 4. It extends in the area between the side plates 20 and 21 of the conveyor main housing and rests at its opposite ends on a pair of laterally spaced hollow tubes 56. The tubes 56 which are formed of rubber or other suitable flexible material are filled with a fluid and sealed at both ends thereof so that they are flexible while at the same time they support the magnetic assemblies 41. The side plates 43 and 44 of the magnet housings 42 are each slotted at 57 and 58 along opposite vertical edges thereof to accommodate cross bars 60 which extend between the housing plates 20 and 21 and form limit stops for vertical movement of adjoining magnet assemblies 41.

In using the above described apparatus in a piling operation as illustrated in FIGURE 1, the sheets S are fed to the entry end of the conveyor 10 by the entry conveyor 12 and the switch 16 is operated by passage of successive sheets to actuate the electromagnets in the conveyor unit 10 so as to pick up each successive sheet from the top run of the conveyor 12 and hold the sheet against the lower run of the traveling belts 39. As the sheet advances any wave or ridge in the top surface is accommodated by vertical movement of the magnet assemblies 41 as the sheet progresses along the bottom of the conveyor. If the sheet is bowed down then the magnets will move down slightly towards the sheet causing the fluid in the tubes 56 to be subject to compression and thereby causing adjoining magnets to rise slightly. If there is a hump in the sheet the successive magnets will be raised by the movement of the sheet as it advances. As the sheet moves forward all magnets will thus follow the waves in the sheet surface since each magnet assembly 41 is free to move between the side plates 20 and 21 of the conveyor. The belts will follow the shape of the sheet because the top run of the belt is tight and the bottom run is loose, the conveyor being driven through the pulley 25 at the entry end. The tension in each of the belts 39 is adjusted by rotating the nut 36 so that the magnets will in effect float on the fluid filled tubes 56.

A modified form of the invention is illustrated in FIGURES 5 and 6 wherein a conveyor unit is employed which does not have traveling belts. The conveyor 70 comprises a magnet housing 71 which is formed by laterally spaced, vertically disposed side plate members 72 and 73 having outturned flanges 74 and 75 at their upper edges which are secured to a horizontally disposed cross plate 76 which forms a support for the side plates, the latter depending from the lower face thereof. A series of electromagnet assemblies 77 are supported in the housing between the side plates 72 and 73.

Each of the magnet assemblies 77 comprises a downwardly opening housing or support bracket 78 of inverted, generally U-shaped cross section which is of non-magnetic material, such as aluminum, and which has secured thereon a base plate 79 forming the head of an upstanding support bolt or stud 80. An electromagnetic coil 81 is seated in the pocket forming recess provided in the housing 78 with its longitudinal axis extending transversely of the rail unit so as to receive the pole piece 82 which is supported at its opposite ends in suitable bearings 83, with the latter being mounted in suitable apertures in the side walls 84 and 85 of the housing 78. The pole piece 82 has its ends projecting beyond the outer faces of the side walls 84 and 85 of the housing 78 and through slots 86 and 87 provided in the conveyor side walls 72 and 73, and a pair of wheel-like pole extensions 88 and 90 of identical construction are mounted thereon, the wheels 88 and 90 being of sufficient diameter to bring their lower periphery below the bottom edge of the housing 78 of the assembly. The housing 78 is vertically slidable between the conveyor side wall plates 72 and 73 and is supported by a cross plate 91 which is secured on the upper end of the stud bolt 80 by the nut 92. The cross plate 91 has its ends resting on a pair of fluid filled tubes 93 which are formed in the same manner as the tubes 56 and which are housed in a compartment 94 formed between a pair of lonigtudinally extending channels 95 and 96. The channels 95 and 96 are mounted so as to face outwardly in opposite directions on the horizontally disposed cross plate 76 and have their upper flanges connected by a cover plate 97. The side walls or plates 84 and 85 of each magnet housing 71 are slotted along their vertical edges at 98 and 99 for accommodating cross bar members 100 which are secured between the plates 72 and 73 of the magnet housing 71 and form stops for limiting the vertical movement of the adjacent magnet assemblies 77 in both the upward and downward direction.

The modified conveyor 70 is adapted to be used in the same manner as the previously described form. Each of the magnet assemblies 77 is free to move a limited amount in a vertical path so that a sheet fed beneath the conveyor which has a bow will cause the successive assemblies to move up or down as required to maintain engagement of the wheel members 88 and 90 with the sheet surface, the fluid filled tubes 93 serving to cushion the movement in either direction.

While particular materials and specific details of construction have been referred to in describing the forms of the conveyor which are illustrated, it will be understood that other materials and different details of construction may be resorted to within the spirit of the invention.

I claim:

1. A metal sheet conveyor comprising an elongate frame, a plurality of longitudinally spaced electromagnetic assemblies each mounted for limited vertical movement on the lower face of said frame, means associated with said assemblies for advancing a sheet in a path beneath said assemblies, an elongate cushion forming member mounted on said frame and means supporting the individual assemblies on said cushion forming member so that successive assemblies are free to move vertically and follow the contour of the uppermost surface of the sheet as the sheet is advanced beneath the same.

2. A conveyor for metal sheets which comprises an elongate frame having an endless traveling belt supported on pulleys mounted at opposite ends thereof, a plurality of longitudinally spaced electromagnets mounted for individual vertical movement on said frame above the lower run of said belt which electromagnets are operative to exert a magnetic force on a sheet and hold the same against the lower surface of the traveling belt, and means forming a support for the individual electromagnets which permits successive electromagnets to move vertically and enables the belt to conform to irregularities on the belt engaging surface of the sheet as the sheet is progressively advanced beneath the electromagnets by forward movement of the belt.

3. An electromagnetic conveyor for metal sheets comprising an elongate frame having one or more endless traveling belts mounted thereon and a plurality of electromagnets mounted in longitudinally spaced relation along said frame which electromagnets are operative to hold the sheets against the bottom surfaces of the belts by electromagnetic force, means for supporting said electromagnets for limited vertical movement, said means responding to movement of the sheet in accordance with irregularities of the belt engaging surface so as to cause the belts to engage with the surfaces of the sheets and substantially conform to irregularities thereon as the sheets are carried along beneath the conveyor.

4. An overhead conveying apparatus for metal sheets comprising an elongate frame, a plurality of electromagnets mounted for vertical movement and in longitudinally spaced relation on said frame, a flexible tube extending longitudinally of said frame, a vertically disposed supporting member extending above each of said electromagnets and having a cross bar resting on the top surface of said tube, said tube being filled with a fluid material so as to cushion raising and lowering movement of each of said electromagnets, and means associated with said electromagnets for engaging the top surfaces of the sheets and advancing the same beneath said electromagnets, said sheet engaging means being vertically movable with the electromagnets whereby successive magnets rise or fall so as to follow the contour of the surfaces of the sheets as they are advanced beneath the conveyor.

5. An elongate sheet conveyor unit comprising a longitudinally extending frame, a plurality of longitudinally spaced electromagnetic assemblies each mounted for limited sliding movement in a vertical direction on said frame, a sheet feeding conveyor associated with said assemblies for delivering sheets to said conveyor, means for advancing each successive sheet in a path extending beneath said assemblies, an elongate cushion forming member mounted on said frame above said assemblies and means supporting the individual assemblies on said cushion forming member so that said cushion forming member will partially collapse under the weight of said assemblies and successive assemblies will move vertically and follow substantially the contour of the uppermost surface of a sheet as the sheet is advanced beneath the same.

6. A conveyor for metal sheets which comprises an elongate frame having an endless traveling belt supported on pulleys adjustably mounted at opposite ends thereof, a plurality of longitudinally spaced electromagnets mounted for individual vertical movement on said frame above the lower run of said belt which electromagnets are operative to exert a magnetic force on a sheet and hold the same against the lower surface of the belt, and means extending along said frame which forms a cushion support for the individual electromagnets so as to cause successive electromagnets to move vertically and allow the belt to conform to irregularities on the belt engaging surface of a sheet as the sheet is advanced beneath the electromagnets by forward movement of the belt.

7. An electromagnetic conveyor for metal sheets comprising an elongate frame having one or more endless traveling belts mounted on end pulleys on said frame and a plurality of electromagnets mounted in longitudinally spaced relation along said frame which electromagnets are operative to hold the sheets against the bottom surfaces of the belts by electromagnetic force, means mounting said electromagnets on said frame for cushioned vertical movement whereby the traveling belts will engage with the surfaces of the sheets and rise and fall as they advance so as to accommodate irregularities on said surfaces as the sheets are carried along beneath the conveyor.

8. An electromagnetic conveyor as recited in claim 7 and stop means for limiting the vertical movement of each of said electromagnets.

9. An overhead conveying apparatus for metal sheets comprising an elongate frame, a plurality of electromagnets mounted for vertical sliding movement and in longitudinally spaced relation on said frame, a pair of flexible tubes extending longitudinally of said frame, a vertically disposed supporting member extending above each of said electromagnets and having a cross bar resting on the top surfaces of said tubes, said tubes being filled with a fluid material so as to cushion the vertical movements of said electromagnets, and means associated with said electromagnets for engaging the top surfaces of the sheets and advancing the same beneath said electromagnets, said sheet engaging means being movable vertically with the individual electromagnets whereby successive magnets rise and fall according to the contour of the surfaces of the sheets as they are advanced beneath the conveyor.

10. A sheet conveyor comprising an elongate frame formed by a pair of spaced side plates and a connecting cross web member intermediate the top and bottom edges thereof, belt pulleys at the opposite ends of said frame, endless traveling belts of wedge-shaped cross section on said pulleys, a plurality of electromagnetic assemblies disposed in a downwardly opening bottom recess formed between the frame plates which assemblied are arranged in longitudinal alignment and mounted for vertical movement, each of said assemblies comprising a non-magnetic housing of inverted U-shape, an electromagnetic coil in said housing, a core of inverted T-shape having its stem portion extending vertically through the coil and secured to the top of said housing, the bottom end of said core having downwardly converging sides forming center guides for said belts, the bottom edges of the side plates of said housing being tapered to form cooperating outer side guides for said belts, belt wear plates between said belt guides, each of said assemblies having an upstanding stem member which extends through an aperture in said cross frame web member, a cross bar on said stem member, a pair of tube members of flexible material extending longitudinally of said conveyor frame and resting on said cross frame web member, said tube members being filled with a fluid material, and the cross bars of the electromagnetic assemblies resting on the top surface of said tube members so as to support said assemblies for cushioned vertical movement and thereby enable the conveyor belts to substantially conform to the surfaces of sheets carried thereon.

11. A sheet conveyor comprising an elongate frame formed by a pair of spaced side plates and a connecting cross web member intermediate the top and bottom edges thereof, belt pulleys at the opposite ends of said frame, endless traveling belts of wedge-shaped cross section on said pulleys, a plurality of electromagnetic assemblies mounted in a downwardly opening bottom recess formed between the frame plates, said assemblies being arranged in spaced relation and in longitudinal alignment, said assemblies being mounted for vertical sliding movement, each of said assemblies comprising a non-magnetic housing of inverted U-shape cross section, an electromagnetic coil in said housing, a core having a stem portion extending vertically through the coil and secured to the top of said housing, said core having downwardly converging sides at its bottom end forming center guides for said belts, the bottom edges of the side plates of said housing having cooperating side guides for said belts, each of said assemblies having a suspending member which extends through an aperture in said cross frame web member, a cross bar on said suspending member, a pair of tube members of flexible material extending longitudinally of said conveyor frame and resting on said cross frame web member, said tube members being filled with a fluid material, and the cross bars of the electromagnetic assemblies resting on the top surfaces of said tube members so as to support said assemblies for cushioned vertical movement and thereby enable the conveyor belts to conform to the surfaces of sheets carried thereon.

12. An electromagnetic conveyor for metal sheets comprising an elongate frame having one or more endless traveling belts mounted thereon and a plurality of vertically movable electromagnets mounted in spaced relation along said frame which electromagnets are operative to hold the sheets against the bottom surfaces of the belts by electromagnetic force, a pair of parallel flexible tube members mounted above said electromagnets, said tube members being filled with a fluid, a suspending rod member for each of said electromagnets which has a top cross bar resting on said tube members, means for limiting the vertical movement of said electromagnets so as to permit the belts to engage with the surfaces of the sheets and conform to irregularities thereon as the sheets are carried along beneath the conveyor.

13. An overhead conveying apparatus for metal sheets comprising an elongate frame, a plurality of electromagnets mounted for vertical movement and in longitudinally spaced relation on said frame, a flexible tube extending longitudinally of said frame, a vertically disposed supporting member extending above each of said electromagnets and having a cross bar resting on the top surface of said tube, said tube being adapted to partially collapse under the weight of said magnets and to cushion raising and lowering movement of each of said magnets, and means associated with said electromagnets for engaging the top surfaces of the sheets and advancing the same beneath said electromagnets, said electromagnets holding the sheets against said sheet engaging means by magnetic force, said sheet engaging means being vertically movable with the electromagnets whereby successive magnets rise or fall so as to follow the contour of the surface of the sheet as it is advanced beneath the conveyor.

References Cited in the file of this patent
UNITED STATES PATENTS

| | | |
|---|---|---|
| 1,809,076 | Shinn et al. | June 9, 1931 |
| 2,217,983 | Hopkins | Oct. 15, 1940 |
| 2,486,733 | Buccicone | Nov. 1, 1949 |
| 2,600,475 | Buccicone | June 17, 1952 |
| 2,642,174 | Buccicone | June 16, 1953 |
| 2,824,638 | De Burgh | Feb. 25, 1958 |
| 2,953,238 | Buccicone | Sept. 20, 1960 |